United States Patent Office 3,702,281
Patented Nov. 7, 1972

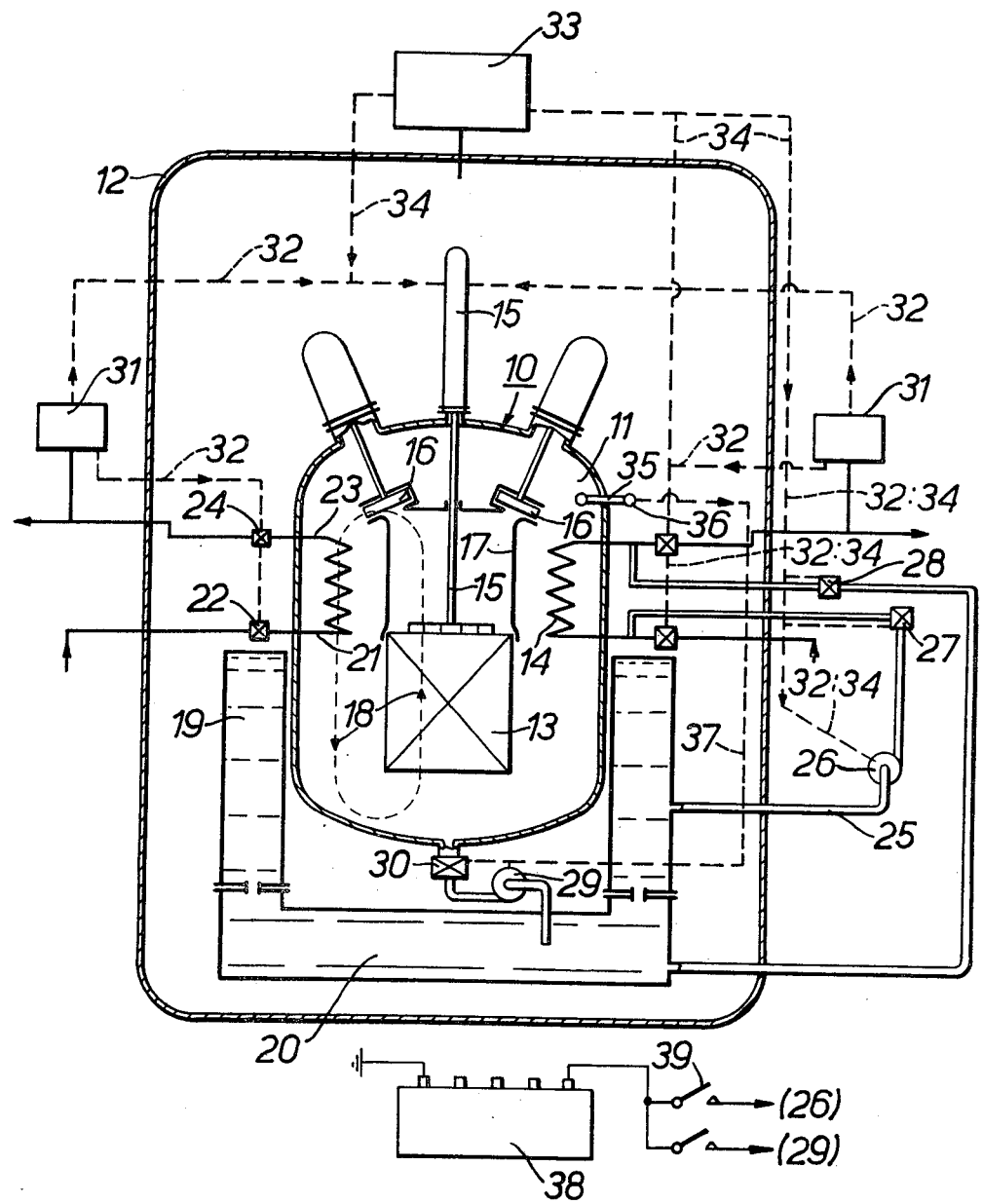

3,702,281
REMOVAL OF HEAT FROM A NUCLEAR REACTOR UNDER EMERGENCY CONDITIONS
Leslie Birts, Knutsford, and Ronald Scott Challender, Warrington, England, assignors to United Kingdom Atomic Energy Authority, London, England
Filed Jan. 12, 1970, Ser. No. 2,194
Claims priority, application Great Britain, Jan. 16, 1969, 2,708/69
Int. Cl. G21d 3/04
U.S. Cl. 176—37
3 Claims

ABSTRACT OF THE DISCLOSURE

A P.W.R. with a steam boiler in the same pressure vessel as the reactor core is provided with an emergency water supply which, on detection of a leak in the reactor coolant circuit, can first be connected as feed to the boiler to reduce reactor coolant pressure by abstracting heat and, when the coolant pressure has fallen adequately, can then be connected to the reactor coolant circuit to maintain the core flooded. The feed of the emergency water supply to the boiler and hence the pressure reduction can be carried out with low powered pumps operated from standby electrical supplies and, with the pressure reduced low powered pumps can again be used to maintain the core flooded. The emergency water supply can serve a dual function by being arranged also to act as a shield for the reactor.

BACKGROUND OF THE INVENTION

This invention relates to nuclear reactors and it is concerned with the removal of heat from the core of a reactor in an emergency caused by loss of normal core coolant facilities, particularly when the prime cause of the emergency is a leak in the primary coolant circuit.

The invention has one application to a reactor type known as the "integral-P.W.R.," that is a reactor cooled and moderated by pressurized water (usually called the primary coolant) the heat taken up from the reactor core by the primary coolant being conducted through a steam boiler which is contained within the same pressure vessel as that occupied by the reactor. (The water in the steam boiler being usually referred to as the secondary coolant.) The invention could be applied to any reactor coolant system where the coolant has the property of showing a significant pressure drop from normal operating pressure when subjected to a temperature reduction. Water coolant provides the best example and the invention is defined and described below in relation to water but is not limited thereby in its broadest concept.

In a pressurised water reactor any leak in the primary coolant circuit which cannot be isolated introduces a danger that so much coolant will be lost that the reactor core will become uncovered, and because there is no longer enough coolant to remove the shutdown heat the fuel, will melt and fission products will be released from the reactor vessel. Replenishment pumps are normally provided to replenish the primary coolant, but as they have to operate against full or nearly full reactor pressure the rate of flow cannot be high unless the pumps are disproportionally large and powerful. Typically, the size of leak which can be replenished in this way is less than ¼ inch bore, and the occurrence of a leak greater than this critical size is likely to be followed by a melt down of the core.

SUMMARY OF THE INVENTION

The invention provides a means for rapidly de-pressurising a reactor which has sustained a leak, so that pumps of low power can be started to replenish the reactor coolant before the coolant level has fallen to a point at which there is a danger of the core melting.

Additionally the invention provides a means of disposal of the shut down heat from the core, whether or not there is also a leak in the primary circuit.

More specifically, a reactor cooled by water at pressure and having a steam boiler for generating steam from heat carried by the reactor coolant is characterised in that means are provided to remove heat from the core of the reactor, on failure of normal core coolant facilities, in two stages using an emergency water supply: in the first stage emergency water from the supply is fed through the boiler so that the reactor coolant has its temperature lowered by heat exchange in the boiler and hence its pressure reduced, and, in the second stage, the water from the emergency supply functions as a reservoir from which the reactor coolant water is replenished.

In one form of the invention water provided for reactor shielding purposes can be used as the supply of emergency water.

The invention has a particular application to situations where only limited stand-by power supplies are available. The reduction in reactor coolant pressure caused by the first stage referred to above allows the second stage, which involves pumping of emergency water up to a reduced reactor pressure, to be carried out with low-powered pumps energised from electrical storage batteries.

DESCRIPTION OF THE DRAWINGS

The invention is further described with reference to the accompanying drawing which is a flow diagram.

DESCRIPTION OF THE PREFERRED EMBODIMENT

An integral P.W.R. installation 10 has a reactor pressure vessel 11 and a containment vessel 12. The pressure vessel accommodates a reactor core 13, steam boilers 14, control mechanisms 15, reactor (primary) coolant circulating pumps 16 and a baffle 17 to cause coolant to flow as indicated by the arrows 18. The vessel 12 is surrounded at its lower region by interconnected shield tanks 19, 20 which are filled with cold water of a purity adequate to serve as an emergency coolant supply for the reactor. The boilers have feed water (secondary coolant) inlet pipes 21 with control valves 22 and outlet steam pipes 23 with control valves 24. Circuits 25 (only one being shown) each consisting of a low powered emergency pump 26 and control valves 27, 28 connect the tanks 19 and 20 with the boilers 14. Low powered replenishment pumps 29 and valves 30 allow the tanks 19 and 20 to be connected with the inside of the pressure vessel 11.

Instrumentation and control equipment includes $N_{16}$ monitors 31 to detect leakage of primary coolant into the secondary coolant and these monitors have control connections 32 (which may or may not involve a human operator) taken to valves 22, 24, 27, 28, pumps 26 and control mechanisms 15. Rise of pressure monitors 33 are provided to detect pressure rises in the containment vessel 12 which indicates a leakage of primary coolant into the vessel 12. Monitors 33 have control connections 34 also going to valves 22, 24, 27, 28, pumps 26 and control mechanisms 15. A differential pressure meter 35 has connections to both sides of the pressure vessel 11, to measure the pressure difference across this vessel, and it has a controller 36 which acts over connection 37 to pumps 29 and valves 30. Emergency power supplies 38 are shown with control switches 39.

Auxiliary equipment like pressurisers etc., common to the integral type of P.W.R. reactor but not of immediate relevance to the invention have not been shown.

In the operation of the reactor described above two emergency conditions are foreseen; one arises from a leak of the primary coolant into the secondary coolant and the other where the primary coolant leaks into the containment vessel 12. In the former case attempts are made to isolate the leak by closing control valves 22, 24. If this is not successful, or the latter type of leak has occurred, then the following sequence of operations is carried out:

(i) Shut down the reactor by signalling over appropriate connections 32 or 34, to control mechanisms 15, (ii) Isolate the boilers 14 by closing the valves 22, 24 if not previously done, (iii) Increase the depressurisation rate of the reactor primary coolant by opening valves 27, 28

(iv) Start the low-powered emergency cooling pumps 26.

The water fed to the boiler 14 from the shield tanks 19, 20 takes heat from the reactor primary coolant and the steam so produced in the boiler is returned to the shield tanks where it is condensed by direct contact with the water therein.

The heat removed from the reactor primary coolant in this way is equivalent to typically, a third to a quarter of the full reactor power and the reactor primary coolant pressure is reduced thereby to a figure of about 50 p.s.i. above that in a containment vessel 12. At this point replenishment pumps 29 are started to pump shield water directly into the reactor and so ensure that the core 13 is kept covered by coolant.

In a particular example, with only 20 H.P. emergency pumps 26 and replenishment pumps 29, the reactor primary coolant pressure is initially 1750 p.s.i. and the vessel 10 has a capacity of 42,000 pounds of water. A leak is detected (of 3.14 square inches in area) and the emergency pumps 26 are started. After 4.25 minutes the pressure in the reactor vessel has fallen from 1750 p.s.i. to 160 p.s.i. by reasons of both the loss of pressure caused by the leak and the reduction of pressure due to the cooling effect of the water circulated by the pumps 26. The fall in pressure in the reactor vessel is accompanied by a rise of pressure in the containment vessel 12 to 110 p.s.i. and a fall in level of reactor primary coolant above the reactor core 13 to 6 feet. With a pressure differential of 50 p.s.i. between vessels 11 and 12 the replenishment pumps 29 can be started and the level of reactor primary coolant maintained.

Without the invention the differential pressure, between vessels 11 and 12, would remain much higher than 50 p.s.i. for a considerable time. The replenishment pumps 29 could not then be started and the level of reactor primary coolant would eventually fall so low that the core would be exposed and melt down would follow.

A leak of the size quoted above is not necesarily the largest which can safely be accommodated by this means but for a particular reactor as the leak gets bigger the time available before the coolant level has fallen dangerously low becomes less and the required rate of heat abstraction by the boiler becomes greater.

What is claimed is:

1. A nuclear reactor comprising:
   a pressure vessel,
   a water cooled reactor core within the pressure vessel,
   a boiler disposed within the pressure vessel heated by reactor coolant for generating steam,
   normal and emergency water supplies outside the pressure vessel and selectively connectable to the boiler inlet,
   a steam take-off conduit from the outlet side of the boiler and selectively connectable to steam using means and to the emergency water supply,
   a conduit extending between the emergency water supply and the pressure vessel,
   pumping means for each of the emergency water supply connections to the boiler and to the pressure vessel for injecting water, respectively, into the inlet side of the boiler and into the pressure vessel,
   means for detecting leakage of reactor coolant,
   means for comparing reactor coolant pressure and emergency water supply pressure, and
   control means responsive to the leakage detection and pressure comparing means arranged, on detection of leakage, sequentially:
   to shut down the reactor,
   to isolate the outlet side of the boiler from the normal water supply and steam using means,
   to connect the outlet side of the boiler to the emergency water supply,
   to pump emergency water to the boiler, and on detection of equal reactor coolant and emergency water pressure, to pump emergency water to the pressure vessel.

2. A nuclear reactor as claimed in claim 1 wherein the emergency water supply also functions as a shield for the reactor.

3. A nuclear reactor as claimed in claim 1 wherein means are provided to cause the emergency water to condense itself in its own supply tanks after passing through the steam boiler.

References Cited
UNITED STATES PATENTS

| 3,528,884 | 9/1970 | Collier et al. | 176—38 X |
| 3,431,168 | 3/1969 | Kjentrup | 176—37 |
| 3,290,222 | 12/1966 | Schoessow et al. | 176—37 |

FOREIGN PATENTS

| 887,252 | 1/1962 | Great Britain | 176—38 |

REUBEN EPSTEIN, Primary Examiner

U.S. Cl. X.R.

176—19 LD, 54